United States Patent Office 3,042,579
Patented July 3, 1962

3,042,579
BACTERICIDAL PROCESS USING p-HYDROXY-DIPHENYLAMINE
Ernst Jacobi and Dietrich Erdmann, Darmstadt, Germany, assignors to E. Merck Aktiengesellschaft, Darmstadt, Germany, a corporation of Germany
No Drawing. Filed Aug. 17, 1959, Ser. No. 833,911
Claims priority, application Germany Aug. 30, 1958
3 Claims. (Cl. 167—31)

The object of the present invention is to provide a bactericidal agent which shows good bactericidal characteristics for a wide spectrum of antibacterial activity. It has been found that p-hydroxy-diphenylamine has these characteristics. This fact was surprising since most of the phenolic compounds which are used as disinfectants nowadays show these characteristics only to a slight extent; in particular, these compounds show a marked reduction of the bactericidal activity in an albumin-containing environment.

Accordingly the object of the invention is to provide a bactericidal agent having a content of a p-hydroxy-diphenylamine of the formula:

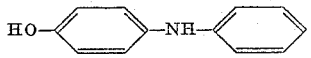

in addition to which there may be included customary carrier or vehicular and/or filler substances.

The p-hydroxy-diphenylamine can also be used in combination with other known bactericidal agents, as for example, in admixture with 2,2'-methylene-bis-3,4,6-trichlorophenol, cresols, xylenols, esters of p-hydroxy-benzoic acid or inverted soaps (cation active detergents).

The p-hydroxy-diphenylamine can be prepared, for example, by condensing hydroquinone with aniline, optionally in the presence of calcium chloride and at elevated temperature and at elevated pressure [Journal of the Chemical Society, London, 1927, page 2856; Berichte der Deutschen Chemischen Gesellschaft, vol. 16, (1883), page 2786; Berichte der Deutschen Chemischen Gesellschaft, vol. 17 (1884), page 2431].

The compound can be prepared in all forms that are customary for bactericidal agents. The compound can be used, for instance, in an alcoholic solution, as a dusting powder in combination with inert fillers, or as tablets, for example, pressed with starch flour, as an emulsion with one of the usual wetting agents, or as a solution which can be sprayed from the conventional aerosol sprayers.

The p-hydroxy-diphenylamine has, in a 10% serum solution, a lethal effect upon bacteria about 10 times higher than that of the known chlorocresol- and/or chloroxylenol-containing disinfectants. Even the bactericidal action of highly diluted 2,2'-methylene-bis-3,4,6-trichlorophenyl against pyogene cocci is attained by p-hydroxy-diphenylamine and partly even surpassed. In a test as a disinfectant (lethal action upon bacteria dried out on smooth or rough surfaces), 1-0.5% solutions not only reliably kill vegetative bacteria but also resistant spore forms of bacillae and chlostrides within a comparatively short time.

The activity can be strengthened by adding the wetting agents customary for disinfectants.

The slight inherent odor and taste of the p-hydroxy-diphenylamine in the usual concentrations of application, and also the fact that the compound is colored only slightly in solutions of low water content, permits use of the compound as a disinfectant in a slightly alkaline and also a slightly acidic range.

In a bactericidal test, 10% serum of horseblood was added to a solution of p-hydroxydiphenylamine in ethanol/water. By this solution coli- and pyocyaneus-bacteria (*Pseudomonas aeruginosa*) are killed at the latest after 30 minutes at a temperature of 25° C., even in a concentration of 1:2000 of the p-hydroxy-diphenylamine. To obtain the same bactericidal action with phenol, chlorocresol or chloroxylenol, a concentration of 1:200 is necessary.

In a dilution of 1:10,000, p-hydroxy-diphenylamine has still a materially stronger activity against coli bacteria and pyocyaneus-bacteria (*Pseudomonas aeruginosa*), and also pyogenes staphlococci, than phenol or chlorocresol or chloroxylenol in a concentration of 1:1000.

Accordingly, the present invention discloses a novel bactericidal agent which is superior in its range of activity and in its intensity of activity to the best heretofore known bactericidal agents which can be prepared by simple methods.

EXAMPLE 1

*Bactericidal Solution*

A mixture of 25 parts p-hydroxy-diphenylamine,
10 parts butylacetate,
10 parts dimethylformamide,
10 parts ethyleneglycolmonoethyl ether,
35 parts xylol,
5 parts water, and
5 parts diethanolaminearalkylsulfonate is used in 10-35% aqueous solution as disinfectant.

EXAMPLE 2

*Bactericidal Powder*

50 kg. of talcum is impregnated with 1.5 kg. of p-hydroxy-diphenylamine by means of acetone. This is then mixed with 1.5 kg. zinc stearate and 47.0 kg. of talcum. The preparation, which may also be perfumed and mixed with skin cosmetic additions, is suitable for use as bactericidal powder.

EXAMPLE 3

*Bactericidal Tablet*

0.5 kg. p-hydroxy-diphenylamine,
0.5 kg. polyvinylpyrrolidone,
1.0 kg. ascorbic acid,
2.0 kg. sorbitol,
2.0 kg. eucalyptus oil,
2.0 kg. ammonium chloride,
25.0 kg. urea, and
47.0 kg. lactose are granulated with ethanol and pressed into tablets while still slightly moist with ethanol. The tablets can be used for sucking or gargling.

EXAMPLE 4

*Bactericidal Spraying Solution*

2 grams p-hydroxy-diphenylamine,
1 gram coniferous oil,
2 grams poylpropylene glycol,
80 grams isopropanol,
80 grams methylene chloride,
80 grams dichlorodifluoromethane, and
20 grams trichlorofluoromethane are filled into an aerosol can and produce a bactericidal spray.

EXAMPLE 5

*Bactericidal Tablet*

0.25 kg. p-hydroxy-diphenylamine,
0.25 kg. bis-(4-hydroxyphenyl)-amine,
1.0 kg. ascorbic acid,
2.0 kg. sorbitol,
2.0 kg. eucalyptus oil,
2.0 kg. ammonium chloride,
25.0 kg. urea, and
47.0 kg. lactose are granulated with ethanol and pressed into tablets while still slightly moist with ethanol. The tablets can be used for sucking or gargling.

It will be understood that the foregoing description of the invention and the examples set forth are merely illustrative of the principles thereof. Accordingly, the appended claims are to be construed as defining the invention within the full spirit and scope thereof.

We claim:
1. Method of killing bacteria which comprises subjecting the bacteria to the action of p-hydroxy-diphenylamine.
2. Method of killing Pseudomonas *Aeruginosa* which comprises subjecting said bacteria to the action of p-hydroxy-diphenylamine.
3. Method of killing staphylococcus bacteria which comprises subjecting said bacteria to the action of p-hydroxy-diphenylamine.

References Cited in the file of this patent

Philip et al.: Berichte, vol. 17 (1884), page 2431.
Sakai et al.: Chem. Abst., vol. 51, col. 5994–5 (1957).
Kraft: Chem. Abst., vol. 44 (1950), col. 10800.
Berichte: Vol. 16 (1183), pp. 2786, 2799–2801.
Sakai et al.: J. Scientific Research Inst., vol. 50, September 1956, pages 175–180.